(12) United States Patent
Reyes

(10) Patent No.: US 10,299,556 B1
(45) Date of Patent: May 28, 2019

(54) PORTABLE ELONGATED OBJECT HOLDER

(71) Applicant: Emmanuelle Reyes, Highland, CA (US)

(72) Inventor: Emmanuelle Reyes, Highland, CA (US)

(*) Notice: Subject to any disclaimer, the term of this patent is extended or adjusted under 35 U.S.C. 154(b) by 236 days.

(21) Appl. No.: 15/179,755

(22) Filed: Jun. 10, 2016

(51) Int. Cl.
*A45F 5/00* (2006.01)
*A45C 13/02* (2006.01)
*A45C 11/34* (2006.01)
*F16B 1/00* (2006.01)
*F16B 47/00* (2006.01)

(52) U.S. Cl.
CPC ............... *A45C 13/02* (2013.01); *A45C 11/34* (2013.01); *A45F 5/00* (2013.01); *F16B 1/00* (2013.01); *F16B 47/003* (2013.01); *A45F 2200/0566* (2013.01); *F16B 2001/0028* (2013.01); *F16B 2001/0035* (2013.01)

(58) Field of Classification Search
CPC ............... A45C 13/02; A45F 2005/108; A45F 2005/002; A45F 2005/1073; A45F 5/00
USPC ........................................................... 206/37
See application file for complete search history.

(56) References Cited

U.S. PATENT DOCUMENTS

| 4,189,048 A | 2/1980 | Gaillard |
| 5,005,710 A | 4/1991 | Hofer |
| 5,515,969 A | 5/1996 | Schonenbach |

*Primary Examiner* — Anthony D Stashick
*Assistant Examiner* — Raven Collins

(57) ABSTRACT

A portable elongated object holder including an obround casing and a plurality of elastically deflectable bristles continuously disposed on an interior surface of the casing. Each of an upper slotted rail and a lower slotted rail of a pair of slotted rails is disposed on the casing. A mounting clip has a clip portion and a bridge portion attached to each of the clip portion and a back surface of a mounting unit. The clip portion of the mounting clip has a pair of squeezable mounting tabs extended outwardly beyond a left surface of the mounting unit. The clip portion of the mounting clip is selectively slidably engageable within the pair of slotted rails. A securing mechanism selectively secures the mounting unit to an immovable surface. At least one of an elongated object is removably securable within the plurality of bristles.

3 Claims, 5 Drawing Sheets

PORTABLE ELONGATED OBJECT HOLDER

BACKGROUND OF THE INVENTION

Various types of object holders are known in the prior art. However, what has been needed is a portable elongated object holder including an obround casing and a plurality of elastically deflectable bristles continuously disposed on an interior surface of the casing. What has been further needed is for each of an upper slotted rail and a lower slotted rail of a pair of slotted rails to be disposed on the casing and for a mounting clip to have a clip portion and a bridge portion attached to each of the clip portion and a back surface of a mounting unit. Lastly, what has been needed is for the clip portion of the mounting clip to have a pair of squeezable mounting tabs extended outwardly beyond a left surface of the mounting unit, with the clip portion of the mounting clip selectively slidably engageable within the pair of slotted rails. A securing mechanism selectively secures the mounting unit to an immovable surface. At least one of an elongated object is removably securable within the plurality of bristles. The portable elongated object holder thus provides a user with a way in which to easily organize and store elongated objects including, but not limited to, pencils, pens, markers, toothbrushes, and razors, that are commonly needed but often misplaced by the user due to a lack of a convenient and portable storage apparatus for them.

FIELD OF THE INVENTION

The present invention relates to object holders, and more particularly, to a portable elongated object holder.

SUMMARY OF THE INVENTION

The general purpose of the present portable elongated object holder, described subsequently in greater detail, is to provide a portable elongated object holder which has many novel features that result in a portable elongated object holder which is not anticipated, rendered obvious, suggested, or even implied by prior art, either alone or in combination thereof.

To accomplish this, the present portable elongated object holder includes an elongated obround casing having a continuous interior surface, an open top side, an open bottom side, a continuous top edge, a continuous bottom edge, a linear exterior front portion, a linear exterior back portion, a pair of convexly curved side portions, and a cavity disposed within the casing and continuously extended from the top side to the bottom side. A plurality of elastically deflectable bristles is continuously disposed on the interior surface of the casing from proximal the top edge to proximal the bottom edge. Each of an upper slotted rail and a lower slotted rail of a pair of slotted rails has an inwardly disposed lip. Each of the upper slotted rail and the lower slotted rail is disposed on the exterior back portion proximal the top edge and the bottom edge, respectively. A length of each of the upper slotted rail and the lower slotted rail is approximately equal to a length of the exterior back portion.

The portable elongated object holder further includes a rectangular mounting unit having a front surface, a back surface, an upper surface, a lower surface, a right surface, and a left surface. A length of the mounting unit is approximately equal to the length of each of the upper slotted rail and the lower slotted rail. A mounting clip has a clip portion and a bridge portion attached to each of the clip portion and the back surface of the mounting unit. The clip portion of the mounting clip has a pair of flexible and squeezable mounting tabs extended outwardly beyond the left surface of the mounting unit. A height between the inwardly disposed lip of the lower slotted rail and the inwardly disposed lip of the upper slotted rail is approximately equal to a height of the bridge portion of the mounting clip.

The clip portion of the mounting clip is selectively slidably engageable within the pair of slotted rails and is configured to be selectively unlockable and, alternately, lockable from within the pair of slotted rails when a user squeezes the pair of mounting tabs together and, alternately, releases the pair of mounting tabs away from each other. The clip portion of the mounting clip is lockable using a pair of slots disposed within the pair of slotted rails and a matching pair of extension members disposed on the pair of mounting tabs of the clip portion that are selectively engageable within the pair of slots. A securing mechanism is disposed on the front surface of the mounting unit. The securing mechanism selectively secures the mounting unit to an immovable surface. The securing mechanism can optionally include a magnet and, alternately, a pair of suction cups. It is also envisioned that the securing mechanism can include adhesive tape and hook and loop fasteners. The immovable surface can include, but not be limited to, a wall of a house and a dashboard of a car. At least one of an elongated object is removably securable within the plurality of bristles. The elongated object can include, but not be limited to, pencils, pens, markers, makeup, toothbrushes, and razors.

Thus has been broadly outlined the more important features of the present portable elongated object holder so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
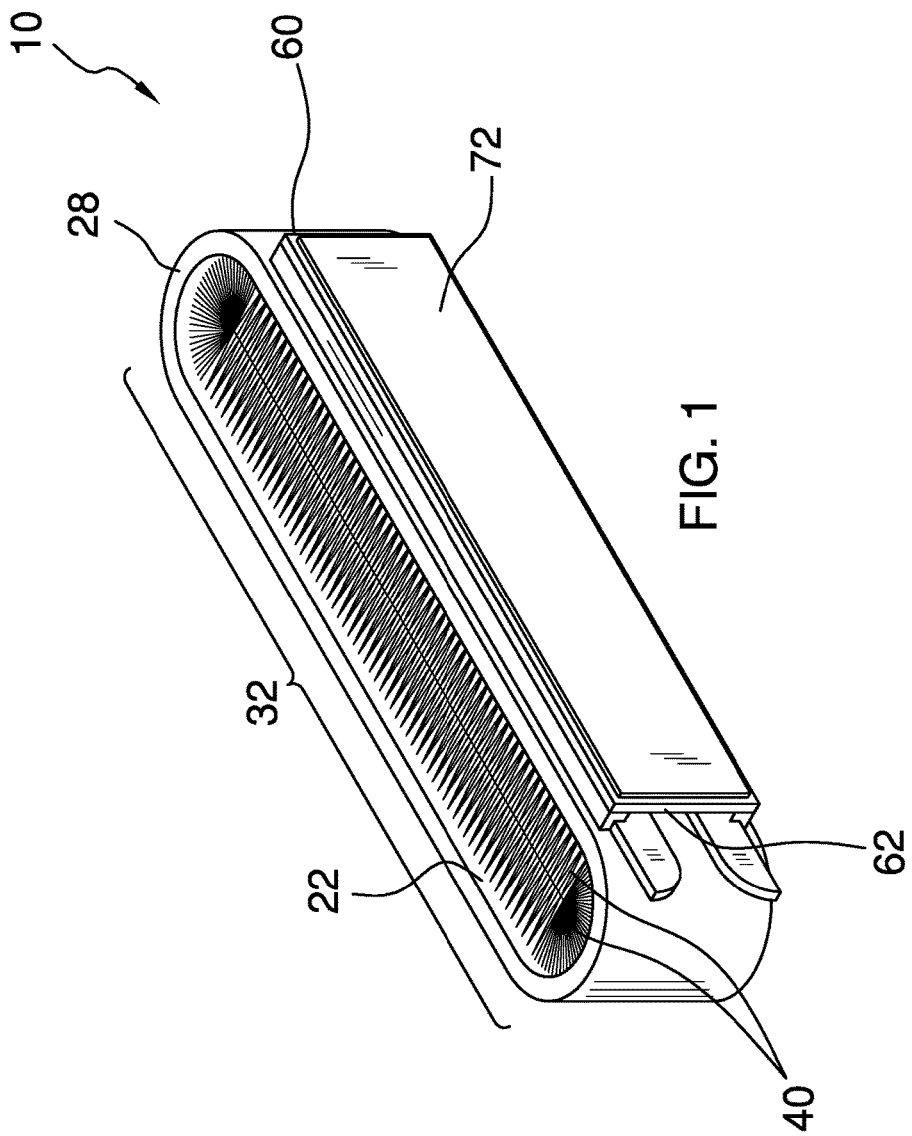
FIG. 1 is a rear isometric view showing a magnet disposed on a mounting unit.
Figure 2:
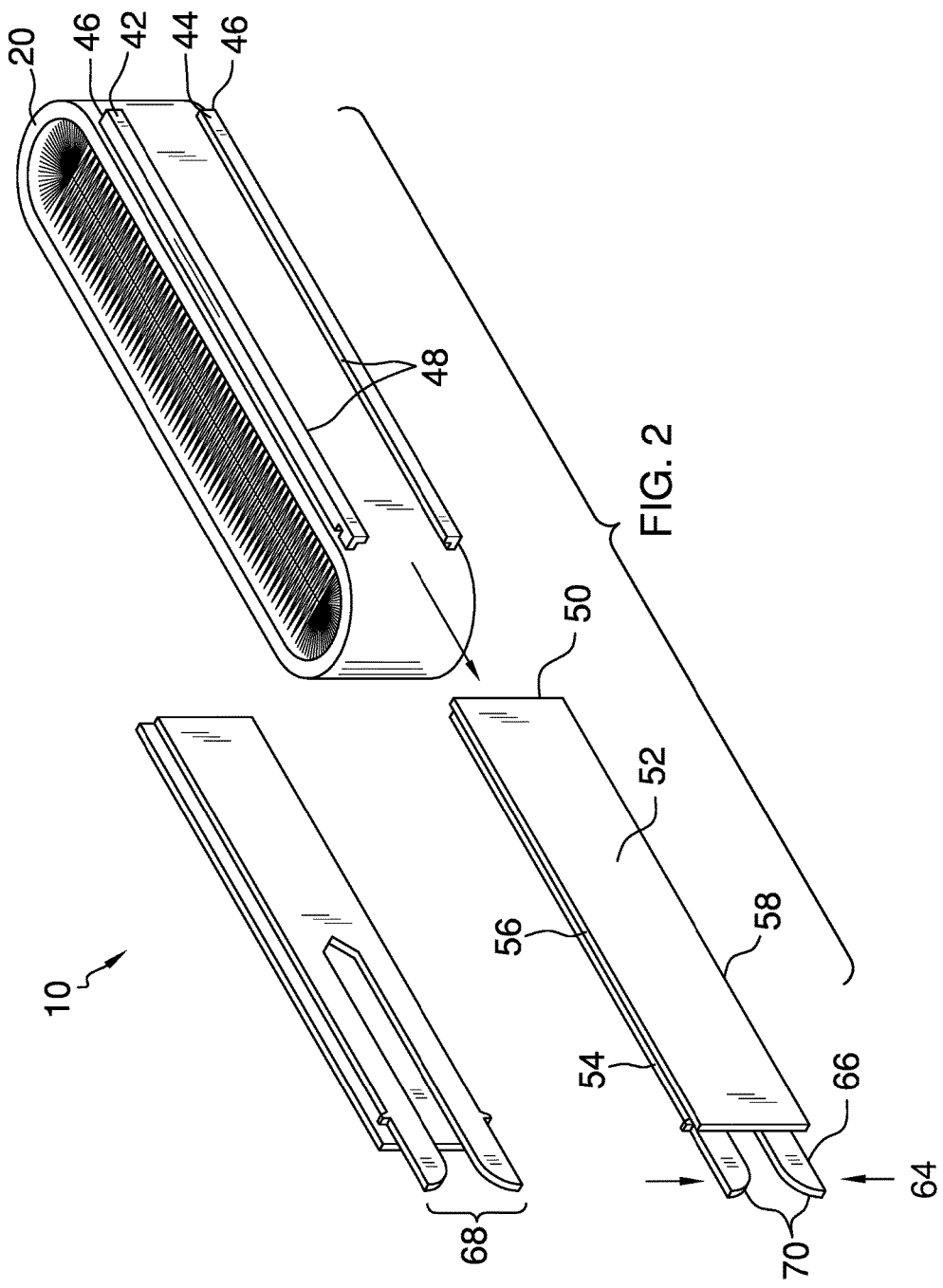
FIG. 2 is a rear isometric view showing a pair of slotted rails.
Figure 3:
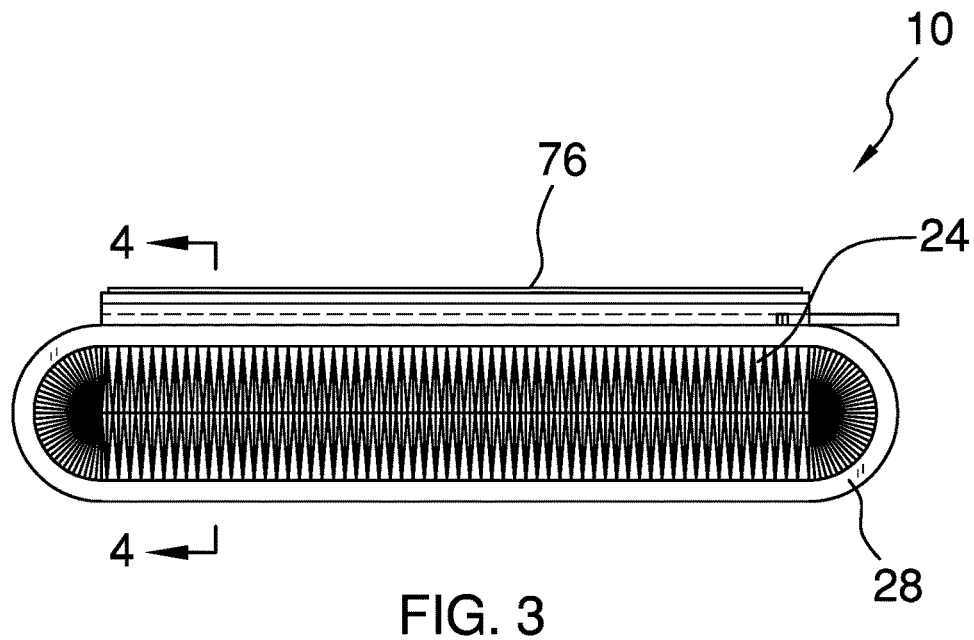
FIG. 3 is a top plan view.
Figure 4:
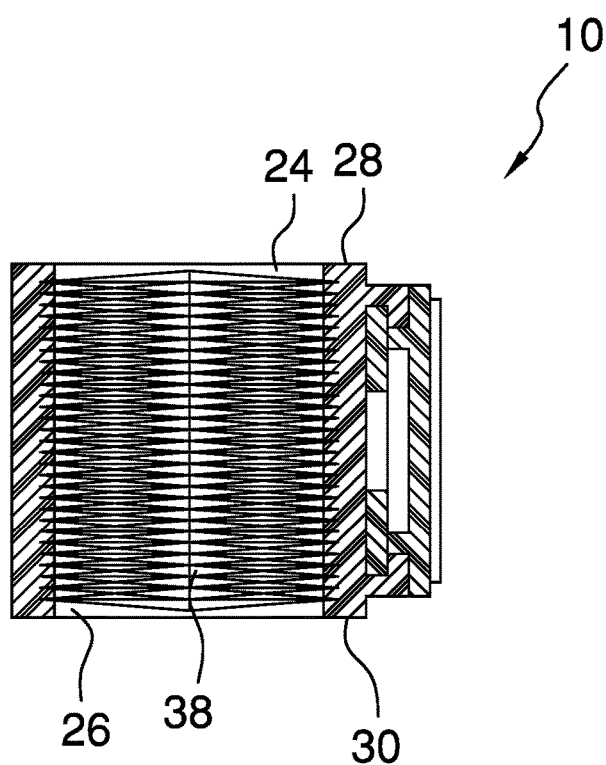
FIG. 4 is a cross-sectional view taken along line 4-4 of FIG. 3.
Figure 5:
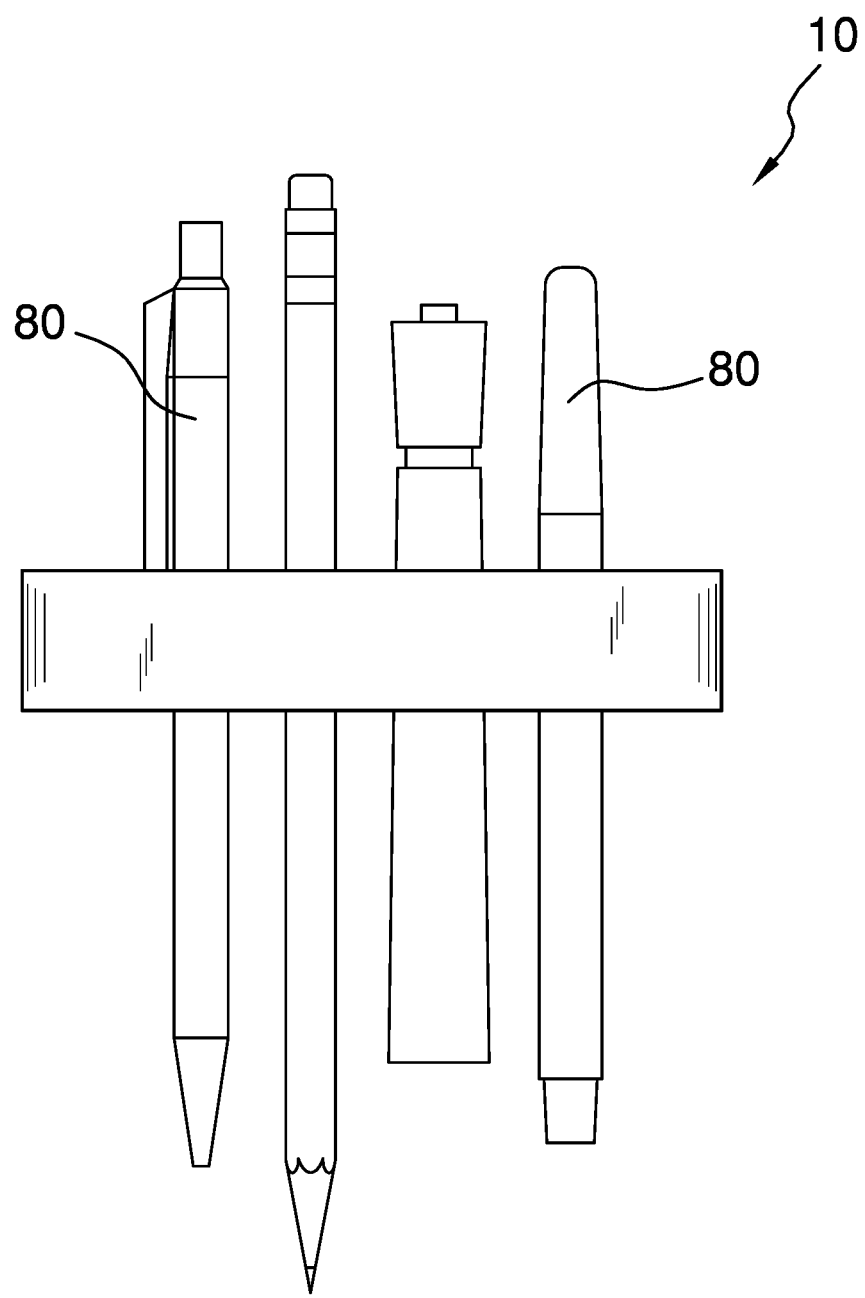
FIG. 5 is an in use view.
Figure 6:
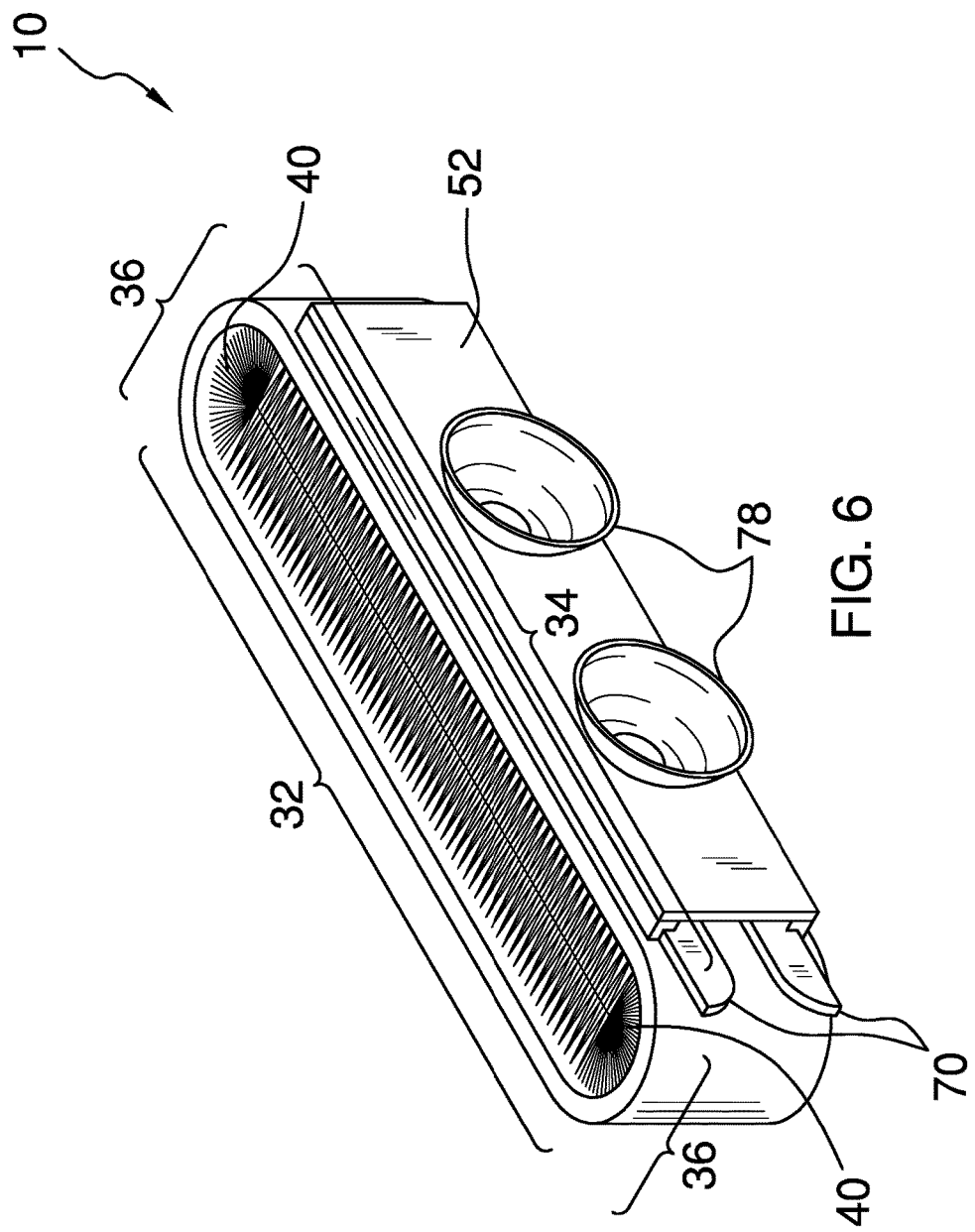
FIG. 6 is a rear isometric view showing a pair of suction cups.

With reference now to the drawings, and in particular FIGS. 1 through 6 thereof, an example of the instant portable elongated object holder employing the principles and concepts of the present portable elongated object holder and generally designated by the reference number 10 will be described.

Referring to FIGS. 1 through 6 the present portable elongated object holder 10 is illustrated. The portable elongated object holder 10 includes an elongated obround casing 20 having a continuous interior surface 22, an open top side 24, an open bottom side 26, a continuous top edge 28, a continuous bottom edge 30, a linear exterior front portion 32, a linear exterior back portion 34, a pair of convexly curved side portions 36, and a cavity 38 disposed within the casing 20 and continuously extended from the top side 24 to the bottom side 26. A plurality of elastically deflectable bristles 40 is continuously disposed on the interior surface 22 of the casing 20 from proximal the top edge 28 to proximal the bottom edge 30. Each of an upper slotted rail 42 and a lower slotted rail 44 of a pair of slotted rails 46 has an inwardly disposed lip 48. Each of the upper slotted rail 42 and the lower slotted rail 44 is disposed on the exterior back portion 34 proximal the top edge 28 and the bottom edge 30, respectively. A length of each of the upper slotted rail 42 and the lower slotted rail 44 is approximately equal to a length of the exterior back portion 34.

The portable elongated object holder 10 further includes a rectangular mounting unit 50 having a front surface 52, a back surface 54, an upper surface 56, a lower surface 58, a right surface 60, and a left surface 62. A length of the mounting unit 50 is approximately equal to the length of each of the upper slotted rail 42 and the lower slotted rail 44. A mounting clip 64 has a clip portion 66 and a bridge portion 68 attached to each of the clip portion 66 and the back surface 54 of the mounting unit 50. The clip portion 66 of the mounting clip 64 has a pair of flexible and squeezable mounting tabs 70 extended outwardly beyond the left surface 62 of the mounting unit 50. A height between the inwardly disposed lip 48 of the lower slotted rail 44 and the inwardly disposed lip 48 of the upper slotted rail 42 is approximately equal to a height of the bridge portion 68 of the mounting clip 64.

The clip portion 66 of the mounting clip 64 is selectively slidably engageable within the pair of slotted rails 46 and is configured to be selectively unlockable and, alternately, lockable from within the pair of slotted rails 46 when a user squeezes the pair of mounting tabs 70 together and, alternately, releases the pair of mounting tabs 70 away from each other. A securing mechanism 72 is disposed on the front surface 52 of the mounting unit 50. The securing mechanism 72 selectively secures the mounting unit 50 to an immovable surface. The securing mechanism 72 can optionally include a magnet 76 and, alternately, a pair of suction cups 78. At least one of an elongated object 80 is removably securable within the plurality of bristles 40.

What is claimed is:

1. A portable elongated object holder comprising:
    an elongated obround casing having a continuous interior surface, an open top side, an open bottom side, a continuous top edge, a continuous bottom edge, a linear exterior front portion, a linear exterior back portion, a pair of convexly curved side portions, and a cavity disposed within the casing and continuously extended from the top side to the bottom side;
    a plurality of elastically deflectable bristles continuously disposed on the interior surface of the casing from proximal the top edge to proximal the bottom edge;
    a pair of slotted rails comprising an upper slotted rail and a lower slotted rail, each of the upper slotted rail and the lower slotted rail having an inwardly disposed lip, wherein each of the upper slotted rail and the lower slotted rail is disposed on the exterior back portion proximal the top edge and the bottom edge, respectively;
    wherein a length of each of the upper slotted rail and the lower slotted rail is approximately equal to a length of the exterior back portion;
    a rectangular mounting unit having a front surface, a back surface, an upper surface, a lower surface, a right surface, and a left surface;
    wherein a length of the mounting unit is approximately equal to the length of each of the upper slotted rail and the lower slotted rail; and
    a mounting clip having a clip portion and a bridge portion attached to each of the clip portion and the back surface of the mounting unit, the clip portion having a pair of flexible and squeezable mounting tabs extended outwardly beyond the left surface of the mounting unit;
    wherein a height between the inwardly disposed lip of the lower slotted rail and the inwardly disposed lip of the upper slotted rail is approximately equal to a height of the bridge portion of the mounting clip;
    wherein the clip portion of the mounting clip is selectively slidably engageable within the pair of slotted rails;
    wherein the clip portion of the mounting clip is configured to be selectively unlockable and, alternately, lockable from within the pair of slotted rails when a user squeezes the pair of mounting tabs together and, alternately, releases the pair of mounting tabs away from each other;
    a securing mechanism disposed on the front surface of the mounting unit, wherein the securing mechanism selectively secures the mounting unit to an immovable surface;
    wherein at least one of an elongated object is removably securable within the plurality of bristles.

2. The portable elongated object holder of claim 1 wherein the securing mechanism is a magnet.

3. The portable elongated object holder of claim 1 wherein the securing mechanism is a pair of suction cups.

* * * * *